(Model.)
G. W. DIBERT.
DEVICE FOR ILLUSTRATING THE PRINCIPLES OF MUSIC.
No. 303,500. Patented Aug. 12, 1884.
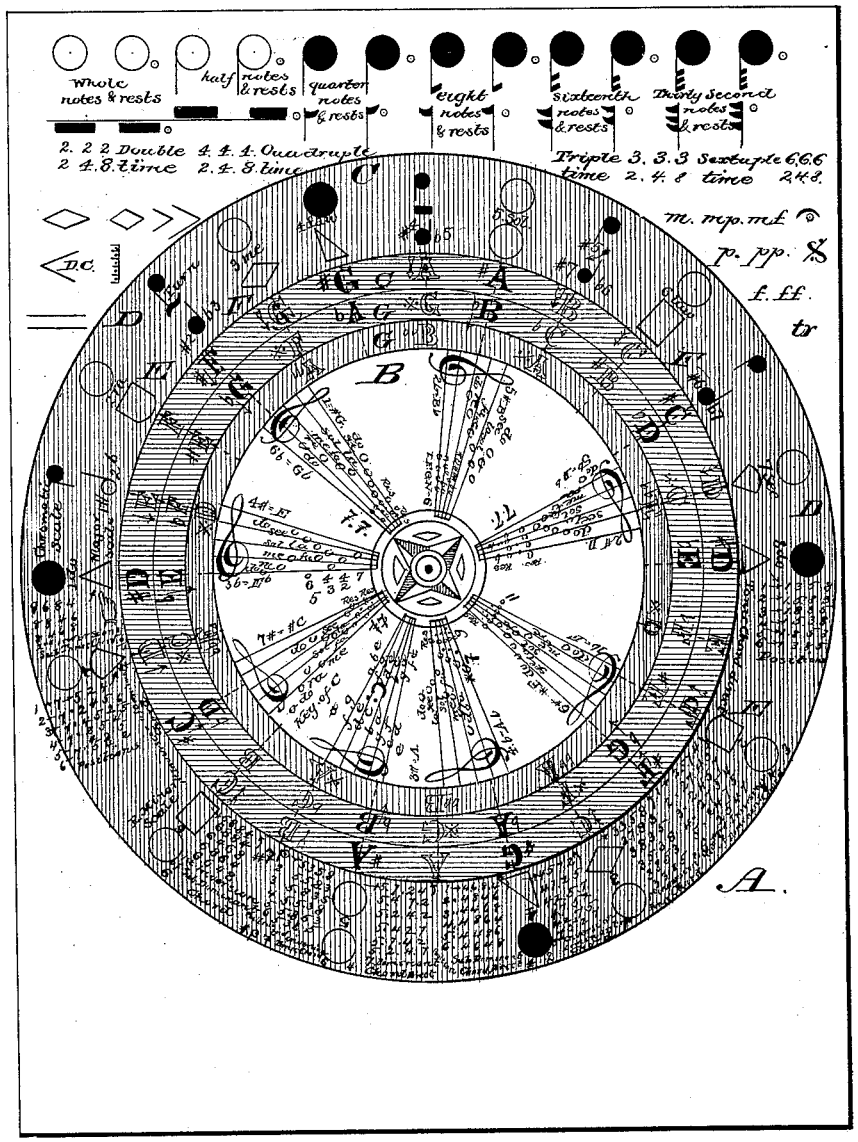
WITNESSES:
INVENTOR.

United States Patent Office

GEORGE W. DIBERT, OF IMLERTOWN, PENNSYLVANIA.

DEVICE FOR ILLUSTRATING THE PRINCIPLES OF MUSIC.

SPECIFICATION forming part of Letters Patent No. 303,500, dated August 12, 1884.

Application filed August 29, 1883. (Model.)

*To all whom it may concern:*

Be it known that I, GEORGE W. DIBERT, a resident of Imlertown, in the county of Bedford and State of Pennsylvania, have invented a certain new and useful Device for Illustrating the Principles of Music; and I hereby declare that the following is a full, clear, and exact description of the same, which will enable others skilled in the art to which it appertains to make and use the same, reference being had to the accompanying drawing, which forms a part of this specification.

My invention has relation to that class of apparatus for teaching music, in which a plate or table has signs and figures relating to the science of music inscribed in a circle and having a disk concentric with the said circle pivoted within the same, the disk having signs and figures inscribed upon it, which may be brought to register with the figures upon the circle of the table by revolving the disk, forming signs and figures for the different musical combinations; and it consists in the improved construction and combination of the parts of such an apparatus, as hereinafter more fully described and claimed.

In the accompanying drawing, which represents a view of the plate or table with its revolving disk and which plate or table may be made of any material desired and mounted in any desired manner, the letter A indicates the table, and B the disk, which is pivoted at its center to turn in the plane of the table. A ring or band, C, is marked upon the table around the periphery of the disk, and a number of larger marks, D, are inscribed near the outer edge of the same, representing the diatonic scale in the round-note system, the intervals between each mark corresponding to the intervals between the notes, and two octaves being preferably inscribed around the ring. Inside these marks are marked names of the notes after the well-known notation "solmization," and inside these names are inscribed marks E of different shapes, representing the characters of the "seven-character system," and the round-note marks, which in playing the scale upon the piano are intended to be struck by the thumb are marked black, while the other marks are simply in outline. At their proper places between the marks or characters of the diatonic scale are marked smaller characters, F, indicating the semi-tones, thus producing the entire chromatic scale when starting from "do" as representing "C" in the scale. In the spaces between the marks upon the lower portion of the band are inscribed several forms of chords representing modulations and inversions of the original chord, the notes of the scale being denominated by numbers from 1 to 8, and above the band are inscribed the characters for the several values of notes and rests, and the several signs used in music. The revolving disk has three rings or bands, G, at its edge, in which the letters indicating the notes are inscribed, the notes which represent the white keys upon the piano-forte being indicated by white letters, and the letters indicating the notes represented by black keys upon the piano being indicated by black letters, all of which letters are at equal distances, the letters in the three bands indicating enharmonically the letters of the notes of the scale, and the space inside the bands has inscribed upon it the fifteen scales as written in the staff, the lines of which are radial, the several chords, inversions, resolutions, and abbreviations of chords, and the lines and spaces in the "F" and "G" clefs.

In using the apparatus the disk may be turned until the key-note of the scale which it is desired to analyze registers with "do" or "1" in the band around the edge of the disk, when by following the diatonic scale upon the said outer ring, the notes upon the ring of the disk which register with the notes upon the outer ring will be the notes of that scale. The positions of the notes of that scale on the staff, as well as the several inversions, &c., will be found in the space inside the rings or bands upon the revolving disk, registering with the key-note of the scale. In this manner it will be seen that a person may analyze the several scales and be enabled to read all chords, inversions, resolutions, and abbreviations belonging to the several keys by simply bringing the key-note of the scale to register with "do" upon the outside ring, or for a minor key with its minor third "la."

Having thus described my invention, I claim and desire to secure by Letters Patent of the United States—

1. In an apparatus for teaching music, the combination of a table having a circular band marked upon it, having the notes of the diatonic scale inscribed by different large marks in the sol-fa system, with the intervals between the characters corresponding to the intervals between the notes of the scale, and having the semi-tones inscribed by smaller marks between the larger notes at their appropriate places, with a disk pivoted to revolve within and concentric with the band, and having the musical alphabet inscribed upon its edge in three concentric circles indicating the letters of the notes enharmonically, the letters being marked at equal distances, as and for the purpose shown and set forth.

2. In an apparatus for teaching music, the combination of a table having a circular band marked upon it, having the notes of the scale in the tonic sol-fa system and the semi-tones inscribed upon it by different characters in different systems, all, however, belonging to the tonic sol-fa system and at equal distances, the intervals between the notes or characters of the several notes corresponding to the intervals between the notes in the scale, with a circular disk pivoted concentrically with and within the said band having the musical alphabet inscribed upon its edge enharmonically, the letters being marked at equal distances and having the several scales inscribed upon the staff, the lines of the same running radially from the center of the disk at the letters indicating the notes corresponding to the scale, as and for the purpose shown and set forth.

3. As an improvement in apparatus for teaching music, a plate or table having a circular band marked upon it, having the notes of the scale in the tonic sol-fa system and the semi-tones inscribed upon it by different characters in different sub-systems to the tonic sol-fa system, the characters being at equal distances, and the intervals between the several characters of the notes corresponding to the intervals between the notes in the scale, and having the several forms of chords representing modulations and inversions of the original chord inscribed in the spaces between the characters upon the lower portion of the band by numbers from 1 to 8, and a circular revolving plate pivoted concentric with and within the band, having the musical alphabet inscribed upon its edge at equal distances and in concentric rows, and having the several scales inscribed upon the staff, the lines of the same radiating from the center of the disk at points corresponding to the letters on the edge indicating the tonic notes of the scales, and showing the several chords, their inversions, resolutions, and abbreviations, as shown and described.

GEORGE W. DIBERT.

Witnesses:
  JOSIAH AMOS,
  HAYES IRVINE.